(12) United States Patent
Zhu et al.

(10) Patent No.: US 8,116,272 B2
(45) Date of Patent: Feb. 14, 2012

(54) METHOD FOR DEALING WITH THE PACKET DOMAIN GATEWAY SUPPORT NODE ERRORS

(75) Inventors: Jinguo Zhu, Shenzhen (CN); Jiannan Cai, Shenzhen (CN); Xiliang Liu, Shenzhen (CN)

(73) Assignee: ZTE Corporation, Guangdong (CN)

( * ) Notice: Subject to any disclaimer, the term of this patent is extended or adjusted under 35 U.S.C. 154(b) by 447 days.

(21) Appl. No.: 12/377,811

(22) PCT Filed: Aug. 10, 2007

(86) PCT No.: PCT/CN2007/002409
§ 371 (c)(1),
(2), (4) Date: Feb. 17, 2009

(87) PCT Pub. No.: WO2008/025222
PCT Pub. Date: Mar. 6, 2008

(65) Prior Publication Data
US 2010/0046362 A1    Feb. 25, 2010

(30) Foreign Application Priority Data
Aug. 21, 2006 (CN) .......................... 2006 1 0112488

(51) Int. Cl.
*H04W 4/00* (2009.01)
(52) U.S. Cl. ....................................... 370/329; 370/349
(58) Field of Classification Search .................. None
See application file for complete search history.

(56) References Cited

U.S. PATENT DOCUMENTS

| 7,672,312 | B1 * | 3/2010 | Hurtta | 370/395.41 |
| 2003/0153309 | A1 | 8/2003 | Bjelland | |
| 2005/0201388 | A1 | 9/2005 | Suh et al. | |

FOREIGN PATENT DOCUMENTS

WO    WO 03/037006    5/2003

OTHER PUBLICATIONS

3GPP TS 23.060 V6.13.0 (Jun. 2006) General Packet Radio Service (GPRS); Service description; Stage 2 (Release 6).*
3GPP TR23.809 V1.0.0 (Sep. 2006); Technical Specification Group Services and System Aspects; One Tunnel Functional Description; (Release 7).
3rd Generation Partnership Project; Technical Specification Group Services and System Aspects; One Tunnel Functional Description, 3GPP Organizational Partners, 2004, Valbonne, France.
3rd Generation Partnership Project Meeting #55, 3GPP Organizational Partners, Oct. 2006, Busan, Korea.

\* cited by examiner

*Primary Examiner* — Kwang B Yao
*Assistant Examiner* — Alex Skripnikov
(74) *Attorney, Agent, or Firm* — Ming Chow; Sinorica, LLC

(57) ABSTRACT

A method for dealing with the packet domain gateway support node errors, including: a Radio Network Controller (4) sends a notification message to a Serving GPRS Support Node (2) according to an error indication message; in the case of a direct tunnel, the Serving GPRS Support Node initiates a process of deactivating a packet data protocol context to a user equipment (1) according to the received notification message, so as to make the states of the packet data protocol contexts in the user equipment, the Serving GPRS Support Node and a Gateway GPRS Support Node (3) consistent.

3 Claims, 2 Drawing Sheets

METHOD FOR DEALING WITH THE PACKET DOMAIN GATEWAY SUPPORT NODE ERRORS

TECHNICAL FIELD

The present invention relates to the 3G mobile communication system packet domain, and especially, to an error processing method when abnormality occurs on the user's plane of the Gateway GPRS Support Node in the direct tunnel scheme.

BACKGROUND

General Packet Radio Service (GPRS) is a 2G mobile communication network based on packet switching, and its related standard is enacted by the European Telecommunication Standards Institute (ETST). When the 3G mobile communication network comes, the GPRS has been evolved into the Universal Mobile Telecommunication System Packet Switch (UMTS PS) domain. The network framework of the UMTS PS is shown in FIG. 1 and it comprises the following network elements:

a NodeB: offering air interface connection for a terminal;

a Radio Network Controller (RNC): mainly managing the radio resource and controlling the NodeB, wherein the combination of the NodeB and the RNC is called Radio Network System (RNS), and an Iub interface is used to connect the RNC and the NodeB, and the terminal accesses to the Packet Core of the UMTS through the RNS;

a Serving GPRS Support Node (SGSN): saving the information of the user's location in the routing area, taking charge of the security and access control, wherein the SGSN connects with the RNC through an Iu interface including an Iu-C interface and an Iu-U interface;

a Gateway GPRS Support Node (GGSN): distributing IP addresses to the terminals and taking charge of the gateway functions to access to the external network, and in the interior, connecting with the SGSN through a Gn-C interface and a Gn-U interface;

a Home Location Register: saving the contract data of the users and their current SGSN addresses;

a Packet Data Network: offering the packet-based service network to the users, and connecting with the GGSN through Gi interface.

There are two kinds of data transmitted in FIG. 1: user plane's data and signaling plane's data. The user plane is responsible for transmitting the service data of the users, while the signaling plane is mainly responsible for managing the user plane, including establishing, releasing and modifying the user plane. In a UMTS PS system, the user plane's path from the User Equipment (UE) to the PDN passes at least three network elements: RNC 4, SGSN 2 and GGSN 3. Correspondingly, there are two tunnels: the tunnel from the RNC to the SGSN and the tunnel from the SGSN to the GGSN, thus, it is called double tunnel scheme. Since both the two tunnels are based on GPRS Tunneling Protocol (GTP), they are called GTP-U tunnel.

With the general development of IP Multimedia Subsystem (IMS) service and the popularization of other multimedia services, the service requires better performance and shorter delay of the transmission layer. Therefore, the Third Generation Partnership Project (3GPP) organization is researching to peel the SGSN from the user plane's path to be the only network element of the signaling plane, and the user plane only includes one tunnel: the GTP-U tunnel directly from the RNC to the GGSN. This is called direct-tunnel scheme, and it is shown in FIG. 2.

Compared with the double-tunnel scheme, the data delay is relatively short in the direct-tunnel scheme since there is one node fewer in the user plane, thus it is more favorable to transmit the multimedia service. However, in certain cases, such as a user is roaming while needs to access to the belonged GGSN, the user plane needs to be lawfully intercepted in the SGSN, the user has intelligent service, and the GGSN does not support the direct-tunnel scheme, the double-tunnel scheme is still needed. The SGSN determines whether to use the direct-tunnel scheme or the double-tunnel scheme.

In the present double-tunnel scheme, when the GGSN receives the SGSN uplink user plane's packet, the packet will be discarded if the GGSN determines that the user plane is abnormal, and the user plane Error Indication message is returned to the SGSN. After the SGSN receives the message, it initiates a process of deactivating Packet Data Protocol (PDP) context to the UE. The process is shown in FIG. 3 and it comprises the following steps:

301, according to the saved GGSN address and tunnel number, the SGSN 2 sends an upstream packet to the GGSN 3;

302, the GGSN 3 receives the packet but can not find out the corresponding user plane's context, it returns the user plane Error Indication message to the SGSN 2;

303, after the SGSN 2 receives the message, it initiates a process of deactivating the PDP context to the UE 1.

When the SGSN receives a RNC uplink user plane's packet, the packet is discarded if the SGSN determines that the user plane is abnormal, and the user plane Error Indication message is returned to the RNC. After the RNC receives the message, it locally releases a Radio Access Bearer (RAB). The process is shown in FIG. 4 and it comprises the following steps:

401, according to the saved SGSN address and tunnel number, the RNC 4 sends the upstream packet to the SGSN 2;

402, the SGSN 2 receives the packet but can not find out the corresponding user plane's context, it returns the user plane Error Indication message to the RNC;

403, after the RNC 4 receives the message, it locally releases the RAB.

In the direct-tunnel scheme, there is no modification for the RNC and the GGSN. After a direct tunnel is established, if the RNC still thinks the Error Indication comes from the SGSN after it receives the Error Indication from the GGSN, it directly releases the RAB. Therefore, although the RNC has detected that the PDP context do not exist in the GGSN, it still can not timely notify the SGSN and the UE to release the PDP context, and the user can not receive the downstream data for a long time, which gives the user a bad experience.

The present invention offers a method in which RNC sends a notification message to the SGSN after the RNC detects that the GGSN is abnormal. After the SGSN receives the message, it initiates the process of deactivating the PDP context to the UE, thus ensuring the PDP contexts in the UE, the SGSN and the GGSN consistent.

SUMMARY OF THE INVENTION

In order to overcome the defects and shortcomings of the prior art, the present invention offers a method for dealing with the packet domain gateway support node errors, and the object of the method is that after the RNC receives the Error Indication message from the GGSN, it avoids the PDP context in the UE and the SGSN being hung up by applying the method, so as to make the PDP contexts in the UE, the SGSN and the GGSN consistent.

In order to achieve the above object, the present invention offers a method for dealing with the packet domain gateway support node errors, and the method comprises the following steps:

1.1: According to an Error Indication message, a RNC sends a notification message to a serving GPRS support node gateway;

1.2: If the serving GPRS support Node determines that it is the case of direct-tunnel, it initiates a process of deactivating a PDP context to a UE according to the received notification message to delete the PDP context in the UE and the serving GPRS support node and make the PDP contexts in the serving GPRS support node and the Gateway GPRS support node consistent.

Furthermore, in said step 1.1, the notification message is a radio access bearer release request message, and the reason value carried in the message shows that the RNC receives the Error Indication message.

Furthermore, in said step 1.2, the serving GPRS support node determines whether the bearer is a direct-tunnel bearer or not according to the saved attributes of the bearer.

Furthermore, in said step 1.2, in the case of direct-tunnel bearer, the serving GPRS support node determines whether the Gateway GPRS support node fails or not according to the notification message; if yes, it initiates a process of deactivating the PDP context to the UE.

Furthermore, said step 1.2 comprises the serving GPRS support node initiating the request of deactivating the PDP context to the UE and the UE returning the response of deactivating the PDP context to the serving GPRS support node.

In the method of the present invention, after the RNC receives the Error Indication message from the GGSN, it sends a notification message to the SGSN, after the SGSN determines that the bearer is direct-tunnel bearer, it knows that the GGSN is abnormal according to the notification message, then it initiates the process of deactivating the PDP context to the UE so as to avoid the PDP context in the SGSN and the UE being hung up for a long time and ensure the PDP contexts in the UE, the SGSN and the GGSN consistent.

BRIEF DESCRIPTION OF DRAWINGS

The present invention will be described in further detail with reference to the accompanying figures and the specific embodiments.

PREFERRED EMBODIMENTS OF THE PRESENT INVENTION

In the method of the present invention, after the RNC receives the Error Indication message from the GGSN, it sends a notification message to the SGSN to notify that said GGSN user plane is abnormal. The SGSN initiates the process of deactivating the PDP context, thus the PDP contexts in the UE and the SGSN can be successfully released. Furthermore, said notification message includes the error reason which indicates that the GGSN user plane is abnormal.

In order to make the object, technical scheme and the main point of the present invention clearer, the present invention will be described in further detail with reference to the accompanying figures.

After the user plane receives the Error Indication, the RNC needs to determine whether the message comes from the SGSN or from the GGSN. One existing scheme is that a sign is put in the RAB assignment request to indicate whether the direct-tunnel is put into service or not. If yes, the RNC determines that the Error Indication message comes from the GGSN, otherwise the RNC determines that the message comes from the SGSN. Another scheme is that the RNC does not determine whether the Error Indication message comes from the SGSN or from the GGSN, it sends a notification message to the SGSN as long as it receives the Error Indication message.

Figure 1:
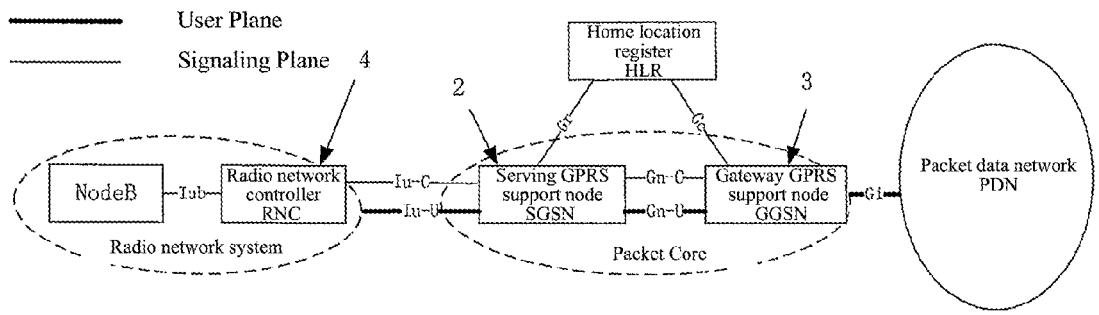
FIG. 1 shows a system architecture of the UMTS/GPRS double-tunnel scheme.
Figure 2:
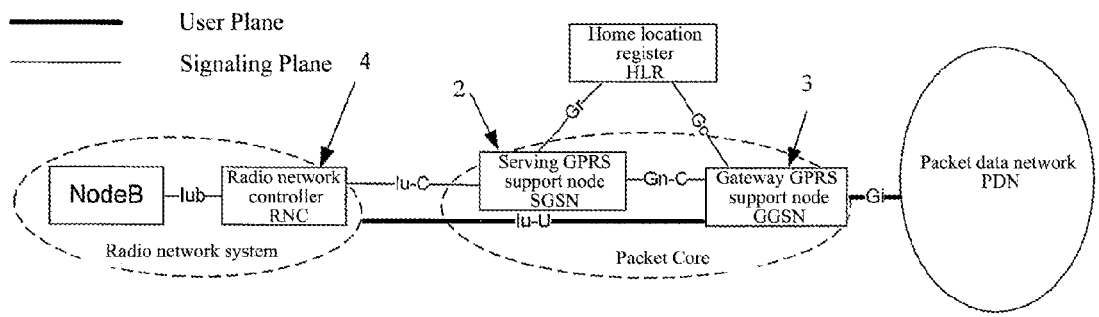
FIG. 2 shows a system architecture of the UMTS/GPRS direct-tunnel scheme.
Figure 3:
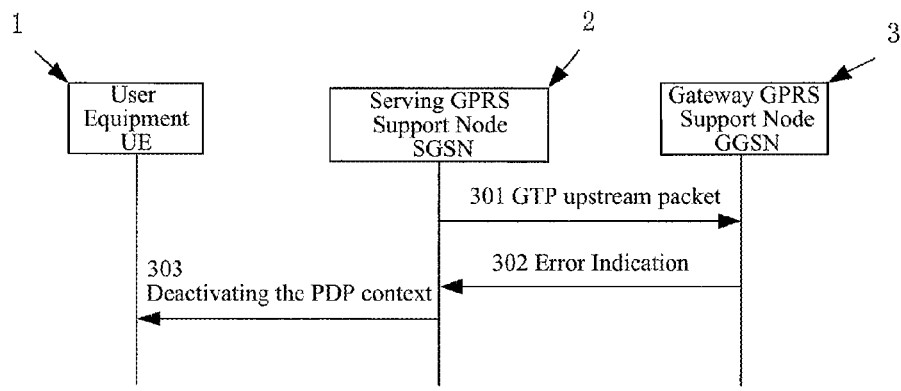
FIG. 3 shows a process of the SGSN receiving the Error Indication message from the GGSN in the case of double-tunnel.
Figure 4:
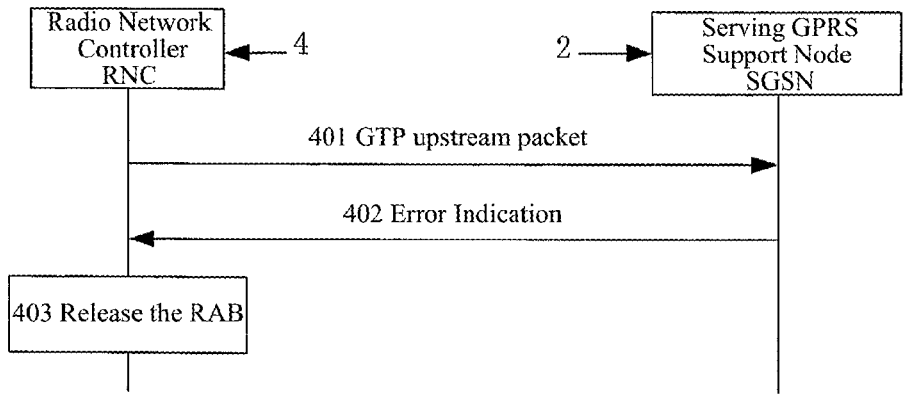
FIG. 4 shows a process of the RNC receiving the Error Indication message from the SGSN in the case of double-tunnel.
Figure 5:
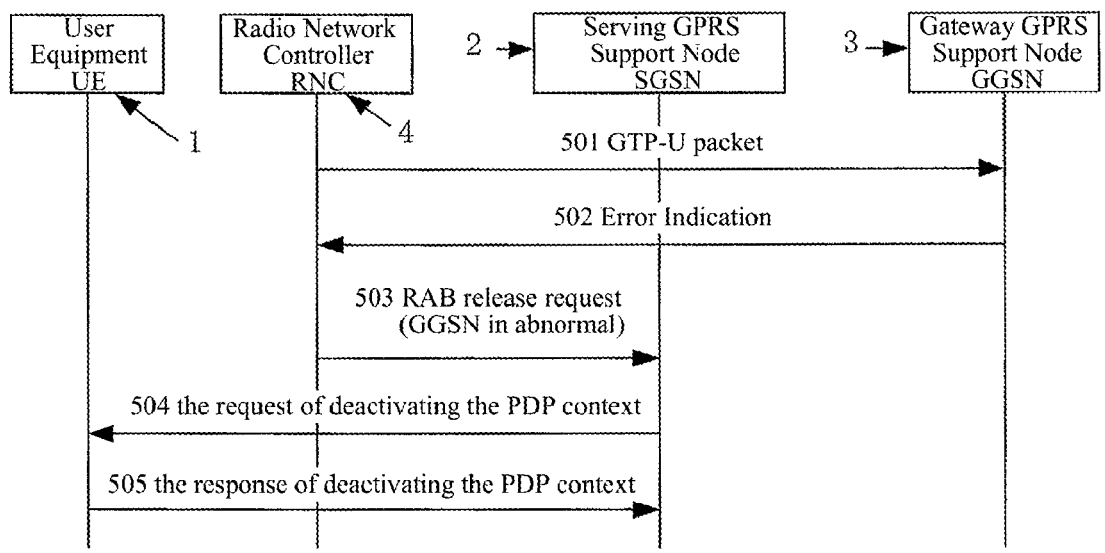
FIG. 5 shows an Error Detection mechanism when the RNC detects that the GGSN is abnormal in the direct-tunnel scheme offered by the present invention.

After the RNC determines that the Error Indication comes from the GGSN, it needs to notify the SGSN. In one embodiment, the RAB release request message is used to notify the SGSN, and an error reason is added into the carried reason value. This reason is of the non-access layer, the reason value, such as 85, indicates that the RNC receives the Error Indication message. The embodiment is shown in FIG. 5 and the following steps are comprised:

501: the RNC 4 sends an upstream packet to the GGSN 3 according to the saved GGSN address and the tunnel number.

502: the GGSN 3 receives the packet but it can not find out the corresponding user plane context, then it returns a user plane Error Indication to the RNC 4.

503: After the RNC 4 receives the Error Indication, it determines that a direct tunnel is put into service and the Error Indication comes from the GGSN 3. The RNC 4 sends to the SGSN 2 a RAB release request including a reason value to indicate that the RNC 4 receives the Error Indication message. The RNC 4 can also directly initiate the RAB release request without determining whether a direct tunnel is put into service, and the request includes a reason value to indicate that the RNC receives the Error Indication message.

504: After the SGSN 2 receives the message, it determines that the bearer applies the direct-tunnel scheme according to the saved attributes of the bearer, and the reason indicated by the RNC 4 is that the RNC receives the Error Indication message, then the SGSN 2 knows that the context in the GGSN has failed, and it directly initiates the process of deactivating the PDP context to the UE 1. Through this process, the RAB between the RNC 4 and the SGSN 2 is released.

505: The UE 1 sends a response of deactivating the PDP context to the SGSN 2.

Through the process of deactivating the PDP context, the PDP contexts in the UE and the SGSN is also deleted. And after that, the UE may re-initiate the request of deactivating the PDP context to re-establish the PDP context.

To sum up, with the method of the present invention, the RNC can notify the SGSN that the GGSN is abnormal, and the SGSN can initiate the process of deactivating the PDP context to the UE according to the received message so as to make the PDP contexts in the UE, the SGSN and the GGSN consistent.

Further, those skilled of the field can make various modifications without departing from the spirit and the scope specified by the appended claim, therefore, the scope of the

What we claimed is:

1. A method for dealing with packet domain gateway support node errors in the case of a direct tunnel, wherein the method comprises the following steps of:
   1.1. a radio network controller sending a radio access bearer release request message with a reason value indicating that the radio network controller receives an Error Indication message to a serving General Packet Radio Service support node according to the received Error Indication message from a gateway General Packet Radio Service support node, to notify the serving General Packet Radio Service support node that the gateway General Packet Radio Service support node user plane is abnormal;
   1.2. the serving General Packet Radio Service support node initiating a process of deactivating a Packet Data Protocol context to a user equipment based on determination, by the serving General Packet Radio Service support node, whether a bearer is a direct-tunnel bearer or not according to saved bearer attributes, and according to the received radio access bearer release request message to make the states of the Packet Data Protocol contexts in the user equipment, the serving General Packet Radio Service support node and the gateway General Packet Radio Service support node consistent.

2. A method of claim 1, wherein in said step 1.2, in the case of a direct-tunnel bearer, the serving General Packet Radio Service support node determines whether the radio network controller receives the Error Indication message or not according to the radio access bearer release request message; if yes, the serving General Packet Radio Service support node initiates the process of deactivating Packet Data Protocol context to the user equipment.

3. A method of claim 1, wherein said step 1.2 comprises the serving General Packet Radio Service support node initiating a request of deactivating the Packet Data Protocol context to the user equipment and the user equipment returning a response of deactivating the Packet Data Protocol context to the serving General Packet Radio Service support node.

* * * * *